Oct. 3, 1944.　　　　G. C. STAATS　　　　2,359,535
LINK
Filed Oct. 7, 1943
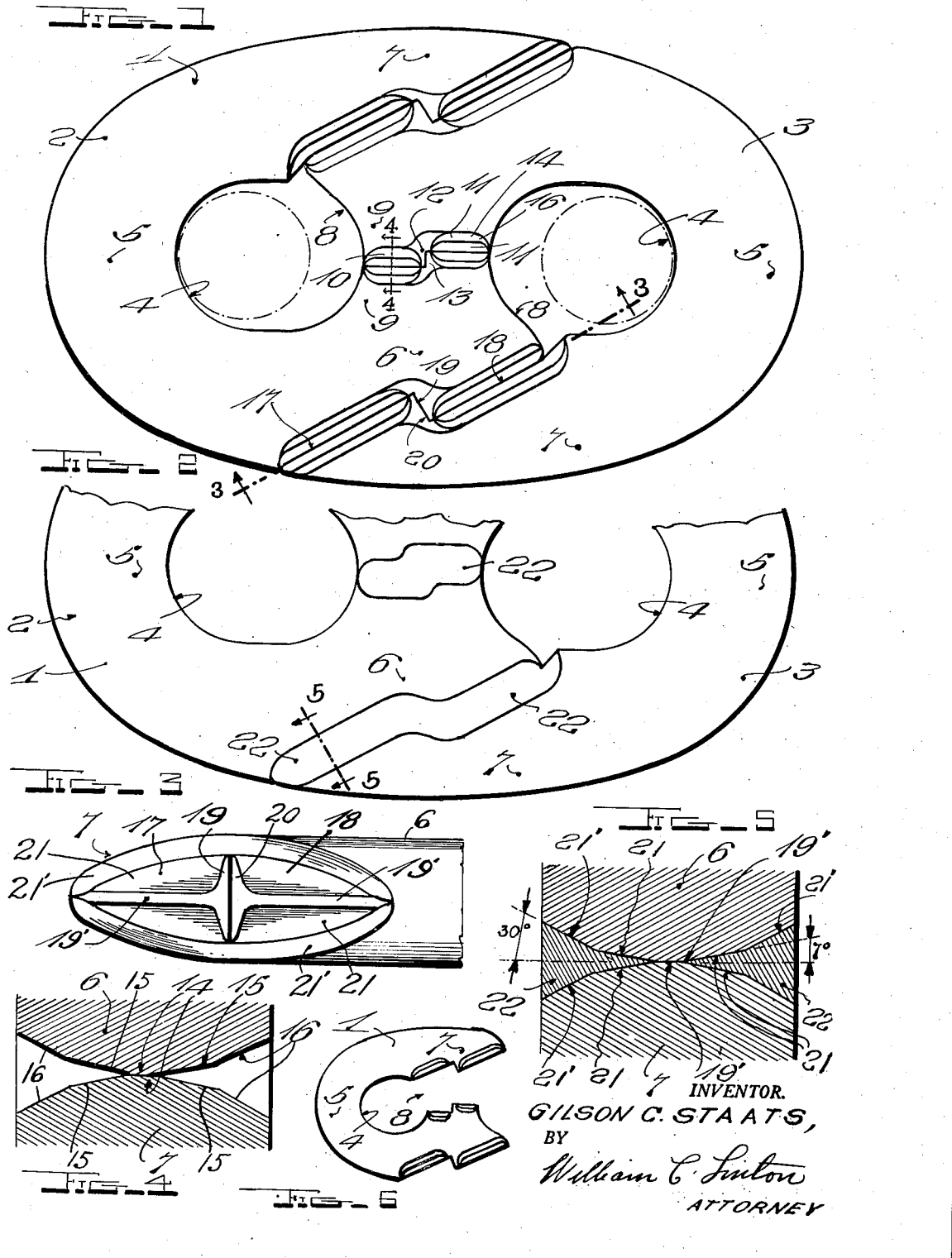
INVENTOR.
GILSON C. STAATS,
BY
William C. Linton
ATTORNEY Patented Oct. 3, 1944

2,359,535

UNITED STATES PATENT OFFICE 2,359,535

LINK

Gilson C. Staats, Chester, Pa.

Application October 7, 1943, Serial No. 505,361

11 Claims. (Cl. 59—84)

This invention relates to certain new and useful improvements in links, and particularly to links of that type formed of complemental sections joined together to form the link. More particularly the present invention relates to links formed of sections welded together.

One object of the invention is to provide a link formed of sections welded together which may be used in conjunction with similar links or in alternation with solid links or other types of links to form a chain of great strength and the links of which may be readily, conveniently and quickly assembled, or which may be used as a coupling link or shackle in all kinds of draft or other connections where the use of a link formed of sections adapted to be united to produce a strong and durable link connection is of advantage or required.

Another object of the invention is to provide a link formed of sections which may be easily and quickly united by electric welding.

Still another object of the invention is to provide a welded sectional link in which the sections are united by solid portions of the sections and welded fillers in such manner as to materially increase the strength and durability of the connection over any ordinary construction of link connections and mode of welding them together.

Still another object of the invention is to provide a welded link construction in which the joints and welds are formed in such manner at such angles to the longitudinal and transverse planes of the link sections and axes of the link as to rigidly unite them to withstand all strains without liability of fracture of the link.

Still another object of the invention is to provide a welded link which is of greater strength and durability and more highly resistant to fracture than a solid link.

Still another object of the invention is to provide a construction in which joined portions of the link sections are interlocked by solid portions against longitudinal separation and welded portions which reinforce the interlocking portions and unite the sections in connection with other solid link surfaces against longitudinal, lateral and torsional strains.

Still another object of the invention is to provide a link of the character described the sections of which may be readily manufactured and then electrically welded in a convenient, expeditious and economical manner.

With these and other objects in view, the invention consists of the novel construction, combination and arrangement of parts, hereinafter fully described and claimed, and as shown in the accompanying drawing, in which:

Fig. 1 is a side elevation of the parts of a closed type of link as they appear when assembled for welding and before they are welded together.

Fig. 2 is a fragmentary side elevational view of the completed link, as it appears when the sections are welded together.

Fig. 3 is a section on the line 3—3 of Fig. 1.

Fig. 4 is a section on an enlarged scale on the line 4—4 of Fig. 1.

Fig. 5 is a section on the line 5—5 of Fig. 2.

Fig. 6 is a fragmentary view of the end portions of one of the link sections.

In carrying my invention into practice I provide a link 1 formed of similar sections 2 and 3 welded together in the manner hereinafter described. The link shown is of the closed type, that is, one provided with a pair of spaced eyes 4 closed at the link center against communication with each other, but features of the invention may also be used in uniting the sections of an open link, that is, one having a single eye or opening extending uninterruptedly through the center and into both link sections.

Each link section is substantially U-shaped and comprises a curved body portion 5 forming its closed outer end, said body portion having arms 6 and 7 spaced to form its eye 4 and to form at its opposite or inner end a normally open throat 8 leading to and from the eye. The normally free ends of the arms 6 and 7 of the link sections which are located on each side of the longitudinal center of the link are adapted to underlap and overlap each other, and the underlapping ends of the arms are formed with inwardly extending bosses 9 adapted to abut and the boss on each link section to be received in the throat 8 of the other to close the throats and also form a bridge between the portions 6 closing communication between the eyes 4.

The overlapping bosses and overlapping free ends of the arms are provided with stepped or zigzag joint closing surfaces comprising solid or integral abutment faces to gage and reinforce them and to hold them against longitudinal separation while being welded, and sloping faces cooperatively arranged to form flaring channels or cavities to receive welding material coacting with the integral abutment faces to rigidly unite the sections and sustain them against longitudinal, lateral, torsional and all other strains normally tending to cause breakage of the link.

As shown, the bosses 9 are provided with joint closing surfaces comprising longitudinally extending stepped faces 10 and 11 arranged in parallel relation with each other and parallel with and on opposite sides of the longitudinal center of the link and abutment faces 12 and 13 arranged at right angles thereto and parallel with each other and on opposite sides of the transverse center of the link. The faces 12 and 13 are transversely straight and flat, but each of the faces 10 and 11 has a central flat or substantially flat longitudinal abutment portion 14 and sloping portions 15 and 16 extending outwardly therefrom toward the sides of the link, the inner portions being arranged at angles of about 7° and the outer portions at angles of about 30° to each other. The construction is thus such as to provide at each side of the portion 14 a flaring receiving channel or cavity the inner portion 15 of which is relatively narrow or of small draft or taper and the outer portion 16 of which is relatively wider and of materially greater draft or taper, as will be readily understood.

Similarly, the opposed lapping ends 6 and 7 are provided with joint closing surfaces comprising stepped or zigzagged joint closing faces 17 and 18 and abutment faces 19 and 20 arranged therebetween. The faces 17 and 18 are arranged at opposite sides of the transverse center of the link and in different planes parallel with each other and obliquely to the longitudinal axis of the link between one of the eyes 4 and one of the sides of the rim surface of the link. Each of these faces 17 and 18, like the faces 10 and 11, has a central substantially flat longitudinal abutment portion 19' and sloping portions 21 and 21' extending outward laterally therefrom toward the opposite sides of the link, the portions 21 being arranged at angles of about 7° to each other and the portions 21' being arranged at angles of about 30° to each other. The construction is thus such as to provide at each side of the portion 19' a flaring receiving channel or cavity the inner portion 21 of which is relatively narrow or of small draft or taper and the outer portion 21' of which is relatively wider and of materially greater draft or taper. The abutment faces 19 and 20 are, like the faces 12 and 13, flat, straight and parallel, but extend between the surfaces 17 and 18 obliquely across the transverse center line of the link.

The link sections as thus constructed are adapted to be readily drop forged and, as they are duplicates of each other, may be economically manufactured and used for the production of complete links. In forming a link therefrom, two sections, such as 2 and 3, are brought into parallel relation, side by side, with their ends 6 and 7 in proper relationship and the sections are then by lateral movement brought into alinement with their said ends overlapping and their abutment surfaces 12, 13 and 19, 20 in engagement with each other, whereby the sections are held from longitudinal displacement. When so disposed the abutment faces 14 and 19' of the respective joint surfaces are also brought into abutting relationship. The link sections are then suitably held rigidly in alinement and a welding composition 22 filled into the channels or cavities formed by the faces 15, 16, 21, 21' and electrically welded therein so as to homogeneously unite with the metal of the link sections. This welding composition may be of the same metal or composition of metals as the link sections or so related thereto as to readily combine under fusion therewith. In welding together the parts of each joint surface it has been found that best results are obtained by first filling the narrow inner flaring portions of the cavities with the welding composition and welding the same therein and then filling the welding compound into the wider outer flaring portions of the cavities and welding the same therein, as thereby most perfect fusion of the compound and surfaces of the link sections for integral combination is secured. The compound is welded in flush with the exposed surfaces of the link and in such manner as to obtain smooth surfaces. When the parts of the link sections are so joined the link sections will be united to form a unitary structure in which solid abutting parts of the link sections are practically surrounded by welded parts arranged so as to resist longitudinal, lateral, torsional and all other strains to which the link may be subjected, and to form a link of greater strength and durability than a drop forged link.

Links of the above described construction embodying my invention may be used alternately with solid links to form a chain, or they may be used as shackles or connectors for many and varied purposes. In using the welded links alternately with solid metal links it will, of course, be understood that the parts of the welded link will be joined to the solid metal link or links to which they are to be connected and then welded to each other. Such a combination of welded and solid metal links will provide a chain which is economical of manufacture and which is of greater strength and durability than a chain formed wholly of solid links.

From the foregoing description, taken in connection with the drawing, the construction and mode of manufacture of my improved link will be readily understood without a further and extended description, and it will be seen that the invention provides a welded link which is of greater strength and durability than a welded link whose parts are welded together in any ordinary simple or conventional way. While the structure disclosed is preferred, it will, of course, be understood that changes in the form, construction, arrangement and proportions of the parts, falling within the scope of the appended claims, may be made without departing from the spirit or sacrificing any of the advantages of the invention.

Having thus described my invention, I claim:

1. A welded link comprising a pair of link sections having overlapping portions provided with radially arranged abutment faces and faces sloping outwardly therefrom and forming flaring cavities of slight taper adjacent to the abutment faces and relatively greater taper between the same and opposed outer surfaces of the link sections, and welding material filling said cavities and welded to the link sections.

2. A welded link construction comprising a link formed of a pair of transversely divided link sections defining an eye at each end of the link and having lapping portions formed with stepped joint faces extending on oblique lines between the eye and outer peripheries of the link sections, and welding material disposed between said faces and welded to the link sections.

3. A welded link construction comprising a link formed of a pair of transversely divided link sections having lapping end portions provided with abutments defining therewith closed eyes on the opposite sides of the abutments, and formed with stepped joint faces extending obliquely and on zigzag lines between the eyes and peripheries of the link sections, and welding material disposed between said faces and welded to the link sections.

4. A welded link construction comprising a link formed of a pair of transversely divided link sections having lapping end portions defining eyes at the ends of the link and formed with stepped joint surfaces including transverse abutment parts arranged perpendicularly to the plane of the link and formed with the sections and normally tending to hold the same from longitudinal separation and joint faces arranged on opposite sides of the abutment parts in different parallel planes and extending obliquely between the eyes and peripheries of the link sections, said joint faces providing flaring cavities at opposite sides thereof and welding material disposed between said faces in said cavities and welded to the link sections.

5. A welded link construction comprising a link formed of a pair of transversely divided link sections having lapping end portions formed with stepped joint surfaces including transverse abutment parts normally tending to hold the same from longitudinal separation and defining closed eyes at opposite ends of the link, and also including joint faces including medially arranged abutment faces extending obliquely between the eyes and peripheries of the sections and faces sloping outwardly therefrom and forming cavities of gradually increasing width between the abutment faces and opposed outer surfaces of the link sections, and welding material filling said cavities and welded to the link sections.

6. A welded link construction comprising a pair of transversely divided link members each having an eye and a pair of inwardly extending arms spaced to form a throat communicating with the eye, the arms of the members having inner abutting surfaces closing the throats of the members and having outer abutting surfaces extending obliquely between the eyes and the outer peripheries of the members, and welding material between said abutting surfaces welding the link members together.

7. A welded link construction comprising a pair of transversely divided members each having an eye and a pair of inwardly extending arms spaced to form a throat communicating with the eye, the arms of the members having inner abutment surfaces arranged between and closing the throats of the eyes and having outer abutment surfaces arranged in over-and-underlapping relation and extending obliquely between the eyes and the outer peripheries of the members, said surfaces each including terminal portions arranged in different parallel planes and intermediate portions arranged at right angles to the terminal portions, and welding material between the terminal portions of the abutment surfaces welding the link members together.

8. A welded link construction comprising a pair of transversely divided members each having an eye and a pair of inwardly extending arms spaced to form a throat communicating with the eye, the arms of the members having inner abutment surfaces arranged between and closing the throats of the eyes and having outer abutment surfaces arranged in over-and-underlapping relation and extending obliquely between the eyes and the outer peripheries of the members, each of said surfaces including opposed abutment faces and spaced faces forming recesses at opposite sides thereof extending between the abutment faces and the sides of the link members, and welding material disposed in said recesses and welded to said surfaces to rigidly unite the link members.

9. A link construction comprising a pair of transversely divided substantially U-shaped members each having an eye and a pair of inwardly extending arms spaced to form a throat communicating with the eye, the arms of the members having inner abutment surfaces arranged between and closing the throats of the eyes and having outer abutment surfaces arranged in over-and-underlapping relation and extending obliquely between the eyes and the outer peripheries of the members, each of said surfaces including portions arranged in stepped relation in different parallel planes and intermediate portions arranged at right angles to the terminal portions, the terminal portions being provided with spaced faces forming recesses at opposite sides thereof, and welding material disposed in said recesses and welded to said surfaces to rigidly unite the link members.

10. A link construction comprising a pair of transversely divided substantially U-shaped members each having an eye and a pair of inwardly extending arms spaced to form a throat communicating with the eye, the arms of the members having inwardly extending abutment surfaces arranged between and closing the throats of the eyes and having outer abutment surfaces arranged in over-and-underlapping relation and extending obliquely between the eyes and the outer peripheries of the members, the inner abutment surfaces being provided with welding recesses at opposite sides thereof and the outer abutment surfaces including each terminal portion arranged in stepped relation in different parallel planes and intermediate portions arranged at right angles to the terminal portions, the terminal portions being provided with welding recesses at opposite sides thereof, and welding material disposed in said recesses and welded in said surfaces to rigidly unite the link members.

11. A link construction comprising a pair of transversely divided substantially U-shaped members each having an eye and a pair of inwardly extending arms spaced to form a throat communicating with the eye, the arms of the members being provided with inner and outer abutment portions, the inner abutment portions being parallel with the longitudinal axis of the link and close the throats of the eyes and the outer abutment portions being arranged at an angle to the longitudinal axis of the link and obliquely between the eyes and outer peripheries of the link members, said portions being formed with recesses at opposite sides thereof intersecting the sides of the link members, and welding material disposed in said recesses and welded to rigidly unite the link members.

GILSON C. STAATS.